United States Patent

[11] 3,590,814

| [72] | Inventors | Bailey Bennett;<br>Joseph R. Preston, both of Columbus, Ohio |
|---|---|---|
| [21] | Appl. No. | 788,823 |
| [22] | Filed | Jan. 3, 1969 |
| [45] | Patented | July 6, 1971 |
| [73] | Assignee | Johnson & Johnson |

[54] INTERDENTAL STIMULATOR
10 Claims, 17 Drawing Figs.

| [52] | U.S. Cl. | 128/62 A, 132/89 |
|---|---|---|
| [51] | Int. Cl. | A61h 7/00 |
| [50] | Field of Search | 132/89, 93; 128/62, 67 |

[56] References Cited
UNITED STATES PATENTS

| 1,138,479 | 5/1915 | Hough | 132/89 X |
| 1,575,317 | 3/1926 | Carmichael | 132/93 |
| 2,771,085 | 11/1956 | Fleming | 132/89 |

*Primary Examiner*—L. W. Trapp
*Attorneys*—John H. Schneider, Alexander T. Kardos ABSTRACT: An interdental stimulator consisting essentially of nonharmful synthetic resinous polymeric material, preferably polystyrene, with cellular and solid-film stratums thereof disposed longitudinally in parallel and alternating sequence with each solid-film stratum joined to adjacent cellular stratums.

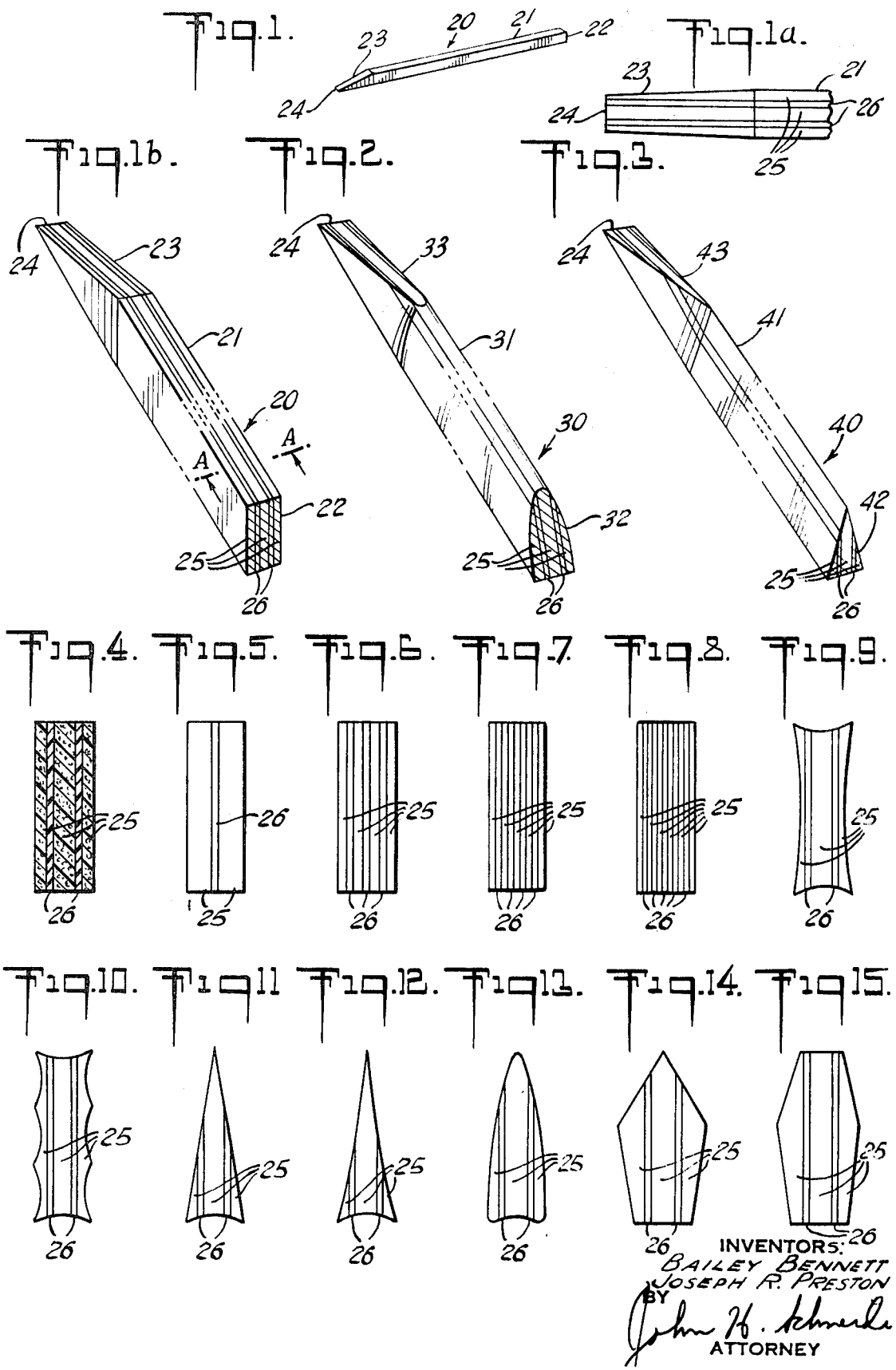

INTERDENTAL STIMULATOR

This invention relates to a useful article for stimulating gums, cleaning teeth, dislodging food particles, and for like dental hygienic purposes. More particularly, the invention concerns an interdental stimulator comprised of cellular stratums of synthetic resinous polymeric material joined to a solid-film stratum therebetween of synthetic resinous material with these strata longitudinally disposed and sequentially arranged to impart requisite useful properties to the interdental stimulator.

Useful articles for various dental hygienic purposes include dental floss, dental ribbons, toothpicks of various kinds, and the like. They are available in a wide variety of shapes, sizes, and materials. Generally they are elongated bodies of a relatively small transverse cross section of requisite size for inserting in the mouth to permit contact with the teeth, gums, and/or surrounding tissues in the oral cavity for their intended purposes. In usage, they are held by fingers, inserted in the oral cavity, and, while so held and inserted, manipulated by the fingers to accomplish appropriate movement of their inserted portion to provide the desired gum stimulation, food particle dislodging, teeth cleansing, teeth polishing, and the like. Generally they are one or more inches in length and have at least one dimension of their transverse cross section of a size not exceeding about one-eighth of an inch. When held and manipulated by the fingers on one hand they need to possess a longitudinal strength adequate to withstand those longitudinal pressures encountered during usage. The ordinary toothpick is illustrative of those primarily held and manipulated by the fingers on one hand, in contrast to those, such as dental floss, ribbons, and the like, where fingers of both hands hold and manipulate them during usage. Frequently the common toothpick consists essentially of a polished hard wood, such as maple. While of adequate longitudinal strength for dislodging food particles, such a wooden toothpick is not readily transversely compressible, so as to conform to surfaces being cleansed and also has a tendency to splinter during usage. Thus, because of its hardness, sharp points, and tendency to splinter, the ordinary wooden toothpick is of very little utility as an interdental stimular in that the gums are easily pricked or otherwise injured if its manipulation is such as to attempt to massage and stimulate the gums. U.S. Pat. No. 2,008,206 illustrates an improvement over such a hard wooden article in that the article is made of balsa wood and of greater utility as an interdental stimulator. A balsa wood article while not as susceptible to splintering as a hard wood article, generally is not as smooth or polished and exhibits some frayed or fibrous edges. Also, while balsa wood is relatively softer and more compressible in comparison to hard wood, balsa wood relies on moistening with saliva or the like to soften it to a condition minimizing splintering and enabling it to conform readily to contours bordering interproximal spaces between teeth. Moreover, when a natural material, such as balsa wood, is used for fabrication, the article's manufacturing is beset by all sorts of uncertainties and problems including an uncertain source and supply, and a variance of properties, such as density, compressive strength, flexural strength, cleanliness and the like, even within short lengths of the balsa wood log, all of which uncertainties and variances make it extremely difficult to manufacture consistently a high-grade and uniform hygienic product of predictable and controllable properties.

Accordingly it is an object of the invention to overcome and to avoid the foregoing-described uncertainties and problems besetting the prior art by fabricating nonharmful synthetic resinous polymeric material into an interdental stimulator of predictable and controllable properties. Another object is to provide an article of a unique construction involving a composite of cellular and solid-film strata of nonharmful synthetic resinous polymeric material particularly structurally arranged and disposed to impart properties requisite for utility as an interdental stimulator. Still another object is to provide an interdental stimulator which is relatively soft and compressible in its transverse direction without relying on moistening of the same to impart those properties which permit its conforming to contours between the teeth. An additional object is to provide an interdental stimulator having longitudinal strength adequate to withstand longitudinal pressures encountered during usage through its structure including parallel and longitudinally disposed closed-cell and solid-film strata of synthetic resinous polymeric material.

All the foregoing and other objects will be apparent from the following description and the accompanying drawings in which:

FIG. 1 is a perspective view of a preferred embodiment of an interdental stimulator of the invention in the approximate size for actual use;

FIG. 1a is a plan view of an enlargement of the tip end of the device of FIG. 1;

FIG. 1b is an enlarged perspective view of the device of FIG. 1;

FIGS. 2 and 3 are perspective views of two additional embodiments of interdental stimulators of the invention;

FIG. 4 is a transverse cross section taken on line A-A of FIG. 1; and

FIGS. 5 through 15 illustrate elevations of additional interdental stimulators embodying the invention. Cross sectioning is omitted for clarity.

For clarity and brevity of illustration, the drawing figures are not necessarily drawn to true scale and in correct proportion and some features thereof have been altered in size to more clearly illustrate the invention.

The invention resides in an interdental stimulator fabricated of nonharmful synthetic resinous polymeric material and in its novel structure involving a particular combination of parts and their structural disposition as herein described and as particularly set forth in appended claims.

Referring to the drawings, in which like numbers identify like parts and components, FIG. 1 illustrates an interdental stimulator, generally designated 20, consisting essentially of nonharmful synthetic resinous polymeric material. Interdental stimulator 20 includes an elongated body generally designated 21, intermediate a relatively blunt end generally designated 22, and another end generally designated 23 from tapering of the transverse cross section of elongated body 21 to line edge 24 of end 23. Interdental stimulator 1 consists of alternating cellular and solid-film strata, designated 25 and 26, respectively, of synthetic resinous polymeric material to total five strata with the sequential order of the stratums 25 and 26 being such that they alternate with each side surface of the interdental stimulator 20 consisting of a cellular stratum 25. All strata 25 and 26 are disposed so as to lie substantially parallel to the longitudinal axis and to extend from end-to-end of the interdental stimulator 20. Each solid-film stratum 26 over each of its major surface areas is joined, as by fusion bonding or adhesive, to an adjacent cellular stratum 25 so as to present a sandwich-type laminate appearance with edges of the solid-film strata 25 being apparent in the top surface and surfaces of ends 22 and 23 of illustrated stimulator 20. Although not visible in the perspective view of FIG. 1, the other edges of solid-film strata 26 coincide with the bottom surface of stimulator 20. Interdental stimulator 20, over a major portion of its length is of rectangular transverse cross section, as is readily apparent from FIG. 4 which illustrates a transverse cross section taken on line A-A of FIG. 1. From FIG. 4 it also can be noted that strata 25 and 26 not only are disposed so as to lie substantially parallel to the longitudinal axis of stimulator 20, but that strata 25 and 26 are disposed so as to lie substantially perpendicular to the bottom surface of stimulator 20. End 23 is a wedge-shaped structure from longitudinally tapering sides, bottom and top surfaces of elongated body 21 to terminate into line edge 24. The other end 22 presents a flat rectangular surface from perpendicularly transversely sectioning elongated body 21 and, in respect to line edge 24, edge 22 is deemed a relatively blunt end.

Although interdental stimulator 20 is illustrated with only one end portion being tapered, i.e., end 23, and it being tapered to line edge 24, it should be understood that both ends may be tapered ends, if so desired. Also, if desired, either and/or both ends instead of tapering to a straight-line edge, may taper to a point, to a curved line edge, to various curved or flat or irregular end surfaces, and the like, and, if desired, may taper inwardly over a portion of its length and then taper outwardly to provide a knoblike end, or even to an enlarged end protuberance, at one or more ends of the interdental stimulator. Prerequisite for the interdental stimulator of the invention is that at least one end of it tapers to an end terminus or tip, be it a point or line edge or small area or whatever, of such a size that its tip or end terminus is smaller than, and thus adopted to enter, without necessity for transverse compression thereof, the interproximal space. The other end of the interdental stimulator may be the same as the tapered end so that either end may be utilized for gum massaging and teeth cleaning in the interproximal spaces of the oral cavity, or may be different, such as a blunt end, to facilitate such blunt end's usage for polishing teeth surfaces.

FIG. 2 illustrates another interdental stimulator, generally designated 30, consisting essentially of nonharmful synthetic resinous polymeric material. Interdental stimulator 30 includes an elongated body generally designated 31 and two ends generally designated 32 and 33. End 32 is a relatively blunt end, somewhat like end 22 of stimulator 20, although end 32 slants slightly as resulting from obliquely transversely sectioning elongated body 31 at an angle other than perpendicular to its bottom surface. Elongated body 31 in transverse cross section closely approximates a semielipse. End 33, alike end 23 of stimulator 20, is a tapered end resulting from tapering of longitudinal surfaces of body 31 to line edge 24. Alike stimulator 20, stimulator 30 consists of alternating cellular strata 25 and solid-film strata 26 of strata resinous polymeric material with the sequential order of strata 25 and 26 being such that at its maximum width dimension its side edges are of cellular strata 25. Also strata stimulator 20, strata 25 and 26 in stimulator 30 are disposed to lie substantially parallel to the longitudinal axis, to extend from end-to-end, and to lie perpendicular to the bottom surface of interdental stimulator 30 with major surface areas of substrata 26 adhered to, or bonded to, adjacent cellular strata 25.

FIG. 3 illustrates another interdental stimulator, generally designated 40, consisting essentially of nonharmful synthetic resinous polymeric material. Interdental stimulator 40 includes an elongated body generally designated 41 and two ends generally designated 42 and 43. Alike stimulators 20 and 30, end 43 is a tapered end resulting from tapering longitudinal surfaces of body 41 to a line edge 24. Elongated body 41 in transverse cross section closely approximates a triangular area whose height is greater than its base dimension. End 42, alike end 22 of stimulator 20, is a relatively blunt end resulting from transversely sectioning body 41 at an angle very close to perpendicular to its bottom surface. Alike stimulators 20 and 30, stimulator 40 consists of alternating cellular strata 25 and solid-film strata 26 of synthetic resinous polymeric material with the same number and like sequential order of strata 25 and 26 and with cellular strata 25 making up the side edges at the widest width dimension of stimulator 40. Also alike stimulators 20 and 30, strata 25 and 26 in stimulator 40 are disposed to lie substantially parallel to the longitudinal axis, to extend from end-to-end, and to lie perpendicular to the bottom of stimulator 40 with major surface areas of sub strata 26 adhered to, or otherwise bonded to, adjacent cellular strata 25.

FIGS. 5 through 15, illustrate transverse cross sections of some additional embodiments of the interdental stimulator, although these figures are not inclusive of all possible embodiments with numerous others readily apparent from the disclosure and teachings herein. Common to each of these illustrated transverse cross sections is that each is composed entirely in alternating sequence of cellular and solid-film strata, 25 and 26, respectively, of synthetic resinous polymeric material with major surface areas of solid-film stratum 26 adhered to, or otherwise bonded to, adjacent cellular stratums 25. As is apparent from FIGS. 4 through 8, the number of cellular stratums 25 always exceeds the number of solid-film strata 26 by one, so that side surfaces of the interdental stimulator, or so that at least the stimulator's side edges at its widest width dimension, are composed of cellular strata 25. Preferred are embodiments containing three cellular strata and two solid-film strata. An upper limit on the number of useful strata employed is dictated primarily upon practical considerations as to ease and cost of manufacture with a total number of strata larger than the nine illustrated in FIG. 8 being possible but generally not economically feasible. Common to each of the embodiments illustrated in FIGS. 5 through 15 is that strata 25 and 26 are disposed to lie substantially parallel to the longitudinal axis of the interdental stimulator and also are disposed to lie perpendicular to the bottom surface of the stimulator or to the surface of a plane projected through the edges of the bottom surface of the stimulator. As illustrated by the Figures, and in particular by FIGS. 9 through 15, the transverse height of the stimulator always exceeds its transverse width and generally and preferably its height is between 1½ to 4 times its width. Also as is intended to be apparent from the illustrated FIGS. 1 through 15, the transverse cross section can vary greatly, as desired, in its particular perimeter configuration. Thus, as desired, cross-sectional configurational peripheries, such as triangular, rectangular, trapezoidal, polyhedral, semioval, semieliptical, with or without rounded or sharp edges, straight, curved, concave, or convex sides, bottoms, top, and the like, all are possible through following the teachings of the invention.

In usage of the interdental stimulator, its tapered end permits ready entry into interpoximal spaces to enable food particles and the like to be dislodged. Where the tapered end terminates in other than a point, i.e., terminates in a line edge or surface area, the end also serves as a means for contacting and rubbing teeth surfaces to polish them. As the tapered end is passed through an interproximal space, it reaches a location on its tapering side surfaces or side edges where further entry becomes possible only through transverse compression of the stimulator. At this entry stage, due to the stimulator's unique construction, transverse compression of cellular strata can occur and upon forcible further entry its cellular side surfaces, or at least its edge surfaces, transversibly compress and conform to contours of the interproximal space to effectively wipe, cleanse, and polish these contours. During this passing of the interdental stimulator through an interproximal space, its bottom surfaces and edges of the interdental stimulator also can contact gum areas between the teeth to massage and stimulate them. The tip of the tapered end also may be used to massage and stimulate gums at regions other than interproximal spaces by gently stroking and prodding such regions. The stimulator's construction has its solid-film strata disposed substantially parallel to its longitudinal axis and also disposed substantially perpendicular to its bottom surface or to the surface of a plane projected through the lowest edges of its bottom so that it possesses longitudinal strength adequate to withstand those longitudinal pressures imposed thereon when it is inserted and forced through interproximal spaces and also imposed thereon when it is firmly pressed against and stroked over gums and teeth. It is important that the solid-film strata be present and be disposed, as just described, in the stimulator. In the absence of solid-film strata reinforcing the cellular strata the stimulator has inadequate longitudinal strength to function in its end application. Minor deviation is permissable in disposition of the solid-film strata being disposed substantially as described, with the stimulator still being of some utility, although not nearly as superior and effective. However upon the orientation of the solid-film strata being altered, and as the deviation proceeds and increases, the stimulator becomes of less and less utility so that by the time the disposition of the solid-film strata in the stimulator be altered so drastically as to be disposed parallel to its transverse direction and/or parallel to its bottom surface or to the surface of a plane projected through the edges of its bottom surface, then again the stimulator has inadequate longitudinal strength to function in its end application. Of course even within these teachings of particular structural orientation of the solid-film strata, it should be recognized that longitudinal strength also can be varied considerably through selection of the particularly employed synthetic resinous polymers for the solid-film strata and also through thicknesses and number of solid-flim strata employed.

Dimensionally the interdental stimulator is an elongated body of a length permitting it to extend from the mouth opening to at least rearward of the teeth, and most generally is of a length between about one to several inches or more. Quite suitable lengths are between about 1¼ to 3 inches. In transverse direction, the useful interdental stimulator is of a height at least equal to and generally greater than its width. Quite useful heights are between one-eighth to one-half inch, and as mentioned earlier its height generally and preferably is between about 1½ to 4 times its maximum width dimension. Important for realization of superior utility of the interdental stimulator of the invention are its maximum width or transverse dimension, and also the dimensions and configuration of its bottom and tapered end. The maximum width dimension as well as the width dimension of the bottom desirably are such that under transverse compression they are able to pass between adjacent teeth and to approximately fit and conform to interproximal spaces between the teeth. By observing this desirable maximum width dimension, not only is the tapered end under transverse compression capable of complete passage through interproximal spaces, but greatly increased utility is provided by additional length of the stimulator under transverse compression also capable of being so utilized. Useful and typical maximum width dimensions generally are between about one thirty-second and one-eighth inch and are selected with due regard to the particular transverse compression properties of the interdental stimulator. Transverse compression properties can be varied greatly through choice and selection of the particularly employed synthetic polymeric material, density and structure of the employed cellular strata, as well as the number and thicknesses of the various strata making up the interdental stimulator's structure. The width dimension of the bottom of the stimulator does not exceed its maximum width dimension and most generally is of the same or a slightly smaller width with this width under transverse compression desirably also being capable of forcible passage through interproximal spaces. The tapered end of the stimulator tapers to a terminus or tip of a point or line edge, or the like, so that without being transversibly compressed at its tip its entry into interproximal space is facilitated.

In general, the interdental stimulator can be prepared by performing cutting, carving, slicing, chiseling, shaping, machining, diecutting, and/or the like operations on suitable larger bodies composed of adhered together or bonded together alternating strata of cellular and solid-film synthetic resinous polymeric material with such operations being performed in such a manner so as to provide an interdental stimulator of the desired size and configuration with its various strata sequentially arranged and structurally disposed in the interdental stimulator as aforedescribed. It is within the skill of the art to prepare suitable larger bodies composed of adhered or bonded together, alternating cellular and solid-film strata of suitable nonharmful synthetic resinous polymeric material and utilization of any of numerous particular preparations and sources of such suitable bodies for subsequent fabrication of the interdental stimulator therefrom is deemed not to be of essence to the present invention.

However, to describe the invention with particularity, a preparation of suitable larger bodies now will be described. From a commercial supplier there is obtained oriented polystyrene film, such as TYCITE® oriented polystyrene film of the Dow Chemical Company, which is available in various widths and in various thicknesses of from 0.85 to 2 mils. Such oriented polystyrene films possess physical properties approximating tensile strengths of 9,000—10,000 p.s.i., ultimate elongations of 10 to 20 percent, modulus of elasticity of about $4.5 \times 10^{1a5}$ p.s.i., and a heat sealing range of about 275—310° F. There also are obtained from a commercial supplier low-density extruded foam polystyrene sheet which is flexible and unicellular, such as sheet extruded from DYLITE® expandable polystyrene of the Koppers Company, Inc., which is available in thicknesses of from 3.5 to 50 mils and densities of between 6.4 to 8.8 pounds/cubic foot. These closed-cell polystyrene sheets possess physical properties depending particularly on their direction of measurement, such as tensile strengths between about 3,000 to 10,000 p.s.i., ultimate elongations from about 2 to 9 percent, and moduli of elasticity between about 3 to $10 \times 10^{14}$ p.s.i.

Alternate layers, in the ordered sequence of closed-cell polystyrene sheet, oriented polystyrene film, closed-cell polystyrene sheet, etc., are laid up in a stack with this sandwichlike composition then being placed in a preheated press and heat-bonded as between aluminum plates, generally under some pressure and/or with spacers to control the desired thickness of the body and to hold the assembled components in firm contact for heat-bonding with each other, for about 10 to 20 minutes at a suitable bonding temperature, such as about 230°—250° F., whereupon the body is cooled to below about 190°—200° F. and removed. In some instances multiple layers of thin solid-film are employed between adjacent closed-cell polystyrene sheets with the multiple thin layers after the bonding operation being so fused together as to be deemed a thicker single solid-film stratum. In such a manner a number of suitable bodies of utility for cutting interdental stimulators therefrom are prepared with their number of strata varied to provide laminated bodies consisting essentially of two closed-cell polystyrene stratum having therebetween and bonded thereto a single oriented polystyrene film stratum ranging up to those laminated bodies consisting essentially of eight closed-cell polystyrene strata and seen oriented polystyrene film strata in alternating sequence. In this number of prepared bodies, pressures during bonding and/or spacers of various sizes are varied, as desired, to provide bodies ranging in thickness from about 30 mils to greater than about one-eighth inch; also the thicknesses of the various closed-cell and solid-films in various stratum combinations also are varied to provide, as desired, bodies with densities between from as low as 4 pounds/cubic foot and up to as high as 65 pounds/cubic foot, with compressive strengths at 30 percent transverse compression as low as 30 p.s.i. to as high as several hundred p.s.i., with surface hardnesses (Shore A-2) of about 60 to 100, and with various combinations of these and other properties.

Following preparation of suitable larger bodies composed of bonded together alternating strata of closed-cell polystyrene and solid-film polystyrene, these larger bodies are converted into useful interdental stimulators, as by employing a sharp knife to cut and/or carve interdental stimulators therefrom, in a manner so as to provide interdental stimulators of desired size and configuration having their strata longitudinally disposed and otherwise structurally positioned as described in the embodiments illustrated by the drawings. While a cold knife edge is useful, the knife edge for cutting may be hot or heated, as desired. Employment of a hot knife can provide some edge and surface sealing of the cut or carved portions of the stimulator, and with an advantageous result thereof being a significant increase in the property of flexural strength of interdental stimulator embodiments consisting of less than about 15 total strata Where a particular surface contour or like is desired for the interdental stimulator other than that of the cut configuration or contour, it is possible to modify and deform a cut surface or surfaces to a desired surface configuration by applying pressure thereto as with a cold or hot stamp or die, with heated means particularly useful when the employed synthetic resinous polymeric material is polystyrene or another thermoplastic material, and with this procedure particularly useful to provide trade markings or other indicia thereon, irregular surfaces, and rounded edges, and even to provide somewhat different physical properties in various stimulator portions, such as a harder surface and/or stiffer tapered end.

From the preceding, it should be apparent in practice of the invention one can provide interdental stimulators possessed of various combinations of a wide range of properties. Particularly preferred is the embodiment, illustrated in FIG. 1 of a typical size having a length of about 2 inches, a thickness of about 0.1 inch and a height of about three-sixteenth inch. In this preferred embodiment of five strata in alternating sequence of closed-cell and solid-film polystyrene it is possible to select and provide various combinations of properties. The following table I presents a number of preferred combinations of properties for this particular embodiment by illustrating some of the various combinations of stiffness, surface compressibility and hardness properties that can be provided. Table I also serves to demonstrate that in other embodiments of the invention one can proceed from the teachings herein and with very little experimentation readily evaluate such embodiments to determine those specific details to be selected for providing particularly desired properties and combinations of properties.

Although polystyrene is the preferably employed nonharmful synthetic resinous polymeric material, various other synthetic resinous polymeric materials also are contemplated as useful. These other useful synthetic resinous polymeric materials include those known to be safe and nonharmful when used in such applications as food packaging, biomedical implanting, denture prosthesis, and like applications, so long as they can be processed by known teachings and means into a cellular or solid-film layer useful to provide a sandwich type structure of alternating closed-cell and solid-film strata which are joined together. Illustrative of these other synthetic resinous polymeric materials considered to be useful for the invention are: high-density and low-density polyethylene, polypropylenes and the like; cellulose acetate; polyester resins; epoxy resins; urethane polymers; polyphenylene oxide polymers; silicone elastomers; and the like. Of course not all of such useful synthetic resinous polymeric materials will provide the equivalent interdental stimulator as that from employing the preferred polystyrene, with some being of lesser or greater cost and/or utility, but each is contemplated to be useful to comprise one or more strata of the interdental stimulator in which all strata do not necessarily have to be of the same synthetic resinous polymeric material. For example, an inter-

TABLE I.—PROPERTIES OF PREFERRED EMBODIMENTS

| Polystyrene stratum thicknesses, mils, | | | | | Bonding to a preset thickness, in. | Bonding temp., F.[a] | Flexural yield value, g./cm² [b] | Slope, g./0.0125 cm. deflection [b] | Hardness, Shore A-2 | Transverse compressive strength at indicated compression, p.s.i. | | | |
|---|---|---|---|---|---|---|---|---|---|---|---|---|---|
| Foam | Film | Foam | Film | Foam | | | | | | 5 percent | 10 percent | 20 percent | 30 percent |
| 40 | 3 | 30 | 3 | 40 | 0.100 | 230 | 2,888 | 1.6 | 62–64 | 4 | 8 | 18 | 36 |
| 40 | 3 | 30 | 3 | 40 | 0.100 | 245 | 2,983 | 2.3 | 75–77 | 9 | 16 | 37 | 76 |
| 40 | 6 | 30 | 6 | 40 | 0.100 | 230 | 3,335 | 2.2 | 68–72 | 4 | 12 | 29 | 71 |
| 40 | 6 | 30 | 6 | 40 | 0.100 | 245 | 4,145 | 2.8 | 75–77 | 12 | 22 | 52 | 121 |
| 40 | 9 | 30 | 9 | 40 | 0.100 | 230 | 6,366 | 2.1 | 70–72 | 8 | 16 | 46 | 153 |
| 40 | 9 | 30 | 9 | 40 | 0.100 | 245 | 5,049 | 3.2 | 82–75 | 19 | 28 | 59 | 156 |
| 50 | 3 | 30 | 3 | 50 | 0.100 | 230 | 3,527 | 1.7 | 67–72 | 8 | 13 | 33 | 72 |
| 50 | 3 | 30 | 3 | 50 | 0.100 | 245 | 3,316 | 2.6 | 75–77 | 24 | 30 | 67 | 80 |
| 50 | 6 | 30 | 6 | 50 | 0.100 | 230 | 6,397 | 3.0 | 75–77 | 16 | 30 | 75 | 189 |
| 50 | 6 | 30 | 6 | 50 | 0.100 | 245 | 3,956 | 3.0 | 82–83 | 16 | 29 | 60 | 141 |
| 50 | 6 | 30 | 6 | 50 | 0.100 | 245 | 6,500 | 3.0 | 85–87 | 20 | 30 | 86 | 180 |
| 50 | 9 | 30 | 9 | 50 | 0.100 | 230 | 6,519 | 3.8 | 70–75 | 22 | 44 | 112 | 292 |
| 50 | 9 | 30 | 9 | 50 | 0.100 | 245 | 6,479 | 3.4 | 75–80 | 12 | 25 | 72 | 232 |

[a] Bonding time usually 10 minutes.
[b] Determined by a modified procedure of ASTM D-790-66 Test Method, "Flexural Properties of Plastics," employing 0.1 inch thick specimens of rectangular cross-section with a one-inch space between supports and with load applied to the specimens midway of their spanned length at a crosshead speed of 0.05 in./min. by an Instron machine. All reported values are the average of at least five tests.

A requirement for utility of a synthetic resinous polymeric material in the invention is that such material be safe, not harmful, and noninjurious to the user of an interdental stimulator, fabricated of the material, when employed in the manner and for the purposes as herein taught. Polystyrene meets this safety requirement as evidenced by a common usage of polystyrene for toothbrush handles and heads, which daily are inserted and manipulated within the oral cavity without harm to the user. As apparent from the preceding teachings of the invention, polystyrene is a preferred synthetic resinous polymeric material for the interdental stimulator and also is preferred as the sole material therein with all cellular and solid-film strata of the stimulator being of polystyrene. Desirably the employed polystyrene be of a virgin grade so as to assure freedom therein from harmful constituents. Polystyrene provides unique advantages for the invention. In contrast to prior-art articles of balsa wood, the physical properties of polystyrene are controllable and predictable to enable uniform production of interdental stimulators fabricated thereof. Additionally polystyrene, in its form and structure as employed in the interdental stimulator, provides an interdental stimulator with a suitable balance of properties satisfactory for its end application and usage. Some properties possessed by the polystyrene interdental stimulator are superior to those of the balsa wood article. In contrast to balsa wood, polystyrene absorbs relatively little water, i.e., in its form and structure thereof in the interdental stimulator, does not need to rely as balsa wood does on a softening with saliva, water, or the like, to be able to conform to contours of interproximal spaces with the polystyrene dental stimulator, and exhibits superior cleaning action.

dental stimulator having a surface stratum of closed-cell cellulose acetate will absorb water more readily than closed-cell polystyrene.

While, as aforedescribed, the interdental stimulator consists essentially of nonharmful synthetic resinous polymeric material and, in particular of sequentially arranged and particularly structurally disposed closed-cell and solid-film stratums of the synthetic resinous material, it is to be understood, if desired, that the interdental stimulator and/or the synthetic resinous polymeric material of which it is fabricated may include minor and conventional amounts of from any to all of numerous other known materials therein and/or therewith without departing from the true scope of the interdental stimulator of the invention. Of course, the only other materials, which may be added and/or included in the interdental stimulator, are limited to those which are safe, nonharmful, and are not injurious to the user of the interdental stimulator when it is employed in the manner and for the purposes as herein described. Thus, as is well known in the art of synthetic plastic polymeric materials, various additive materials and compounding agents, including colorants, pigments, stabilizers, fillers, odorants, and like agents, in conventional amounts for their well-known purposes may be included and be present in the synthetic resinous polymeric material comprising the interdental stimulator. Likewise, as is known in the art of various articles useful for dental hygienic purposes, such articles can contain various additives including flavoring agents, medicants, cleansing additives, odor-pleasing agents, and the like, with it to be understood that minor and conventional amounts of from any to all such additives for known purposes may be present and included in the interdental stimulator. These other materials added for ancillary purposes can be included in the formulation and compounding of the synthetic resinous polymeric material employed for the strata and/or alternatively be impregnated or in other known manners incorporated in the interdental stimulator.

Numerous modifications of the invention will be obvious and apparent from the teachings herein presented with it intended that all obvious modifications be encompassed and included within the invention and with the true scope of the invention being measured by the appended claims.

We claim:

1. An interdental stimulator consisting essentially of nonharmful synthetic resinous polymeric material with cellular and solid-film strata thereof disposed longitudinally in parallel and alternating sequence with each solid-film stratum joined to adjacent cellular strata.

2. An article, useful as an interdental stimulator,
   a. which is an elongated body having length and transverse cross section adapted for inserting into an oral cavity and including an end portion longitudinally tapering to a terminus adapted to enter interproximal space between teeth, and
   b. which consists essentially of nonharmful synthetic resinous polymeric material in parallel strata longitudinally disposed in said elongated body with said strata being alternating cellular and solid-film strata of said material with each solid-film stratum intermediate adjacent cellular strata and joined thereto.

3. The article of claim 2 in which the nonharmful synthetic resinous polymeric material is polystyrene, said cellular strata are closed-cell polystyrene strata, and said each solid-film stratum intermediate said adjacent cellular strata is joined to said adjacent cellular strata by a fusion bond.

4. The article of claim 2 in which said parallel strata longitudinally disposed in said elongated body extend from end to end of said body and also are disposed substantially perpendicular to a plane projected through the edges of its bottom surface, and in which said tapered end portion includes a location thereon having a transverse cross section of a width under transverse compression adapted to fit approximately said interproximal space between the teeth.

5. The article of claim 4 in which said elongated body has a transverse cross section of a maximum width under transverse compression adapted to fit approximately said interproximal space between the teeth, and in which the height of the transverse cross section of said elongated body is between 1½ to 4 times said maximum width.

6. The article of claim 4 having three cellular strata and two solid-film strata.

7. An interdental stimulator for stimulating gums, cleaning teeth, dislodging food particles, and for like dental hygienic purposes,
   a. which is an elongated body having a length and rectangular transverse cross section whose height is greater than its width and having said length, height and width adapted for inserting into an oral cavity, and having an end portion longitudinally tapering to a tip having at least one of its dimensions smaller than interproximal space between teeth, and
   b. which consists essentially of polystyrene in parallel strata longitudinally disposed in said elongated body with said strata being alternating closed-cell and solid-film polystyrene strata with each solid-film intermediate adjacent closed-cell strata and having its major surfaces heat-bonded thereto and with said parallel strata longitudinally disposed in said elongated body also disposed substantially perpendicular to the bottom surface of the elongated body.

8. The interdental stimulator of claim 7
   a. which includes three closed-cell and two solid-film polystyrene strata extending from end to end of the elongated body,
   b. in which said solid-film polystyrene strata are of oriented polystyrene film,
   c. whose elongated body is of a length between 1¼ to 3 inches, of a width between one thirty-second to one-eighth inch, of that height between one-eighth to one-half inch which is between 1½ to 4 times said width, and
   d. in which said tip is a line edge.

9. The interdental stimulator of claim 8 having both end portions tapering.

10. The interdental stimulator of claim 8 characterized by said width of its rectangular transverse cross section under transverse compression adapted to fit approximately said interproximal space between the teeth, and further characterized by a Shore A-2 surface hardness between about 60 to 100 and a density between 10 and 30 pounds/cubic foot.